US007911765B2

(12) United States Patent
Takeoka et al.

(10) Patent No.: US 7,911,765 B2
(45) Date of Patent: Mar. 22, 2011

(54) METALIZED FILM CAPACITOR, CASE MOLD TYPE CAPACITOR USING THE SAME, INVERTER CIRCUIT, AND VEHICLE DRIVE MOTOR DRIVE CIRCUIT

(75) Inventors: Hiroki Takeoka, Osaka (JP); Toshiharu Saito, Toyama (JP); Toshihisa Miura, Toyama (JP); Takeshi Imamura, Toyama (JP); Yoshinari Nagata, Osaka (JP)

(73) Assignee: Panasonic Corporation, Osaka (JP)

( * ) Notice: Subject to any disclaimer, the term of this patent is extended or adjusted under 35 U.S.C. 154(b) by 227 days.

(21) Appl. No.: 11/908,524

(22) PCT Filed: Apr. 7, 2006

(86) PCT No.: PCT/JP2006/307467
§ 371 (c)(1),
(2), (4) Date: Sep. 13, 2007

(87) PCT Pub. No.: WO2006/109732
PCT Pub. Date: Oct. 19, 2006

(65) Prior Publication Data
US 2008/0310075 A1 Dec. 18, 2008

(30) Foreign Application Priority Data

Apr. 8, 2005 (JP) ................................. 2005-112017
Sep. 13, 2005 (JP) ................................. 2005-264959
Sep. 13, 2005 (JP) ................................. 2005-264960

(51) Int. Cl.
*H01G 4/08* (2006.01)
*H01G 4/005* (2006.01)
*H01G 4/32* (2006.01)

(52) U.S. Cl. ...................... 361/323; 361/303; 361/301.5
(58) Field of Classification Search .................. 361/323, 361/304, 309, 301.5, 303, 311, 305
See application file for complete search history.

(56) References Cited

U.S. PATENT DOCUMENTS 3,906,297 A * 9/1975 Hunt ............................. 361/309
4,226,011 A * 10/1980 Hunt ............................. 29/25.42
4,578,737 A * 3/1986 Westermann ............... 361/308.1
(Continued)

FOREIGN PATENT DOCUMENTS

JP 03286514 A * 12/1991
(Continued)

OTHER PUBLICATIONS

Machine translation of JP2005093761A.*
(Continued)

*Primary Examiner* — Eric Thomas
*Assistant Examiner* — David M Sinclair
(74) *Attorney, Agent, or Firm* — Pearne & Gordon LLP

(57) ABSTRACT

A metalized film capacitor capable of exhibiting stable performance in a wide temperature range is provided. The metalized film capacitor has an elliptical cross sectional shape having a major axis of 60 mm or above. In this capacitor, offset for shifting in the width direction of a pair of metalized film is set to 1.2 mm or above. Since the bonding state between metal vapor-deposited electrode and metal sprayed electrode formed on the end surface is stable, a stable contact between metal sprayed electrode and dielectric film is maintained, thereby preferably maintaining tan σ and exhibiting excellent performance even if the use temperature range is increased and the thermal stress is increased.

18 Claims, 12 Drawing Sheets

U.S. PATENT DOCUMENTS

| | | | |
|---|---|---|---|
| 4,654,751 A * | 3/1987 | Tokura et al. | 361/328 |
| 4,670,816 A * | 6/1987 | Johnk et al. | 361/323 |
| 5,057,967 A * | 10/1991 | Den et al. | 361/328 |
| 5,905,628 A * | 5/1999 | Okuno et al. | 361/303 |
| 6,094,337 A * | 7/2000 | Ueda et al. | 361/311 |
| 2001/0011183 A1* | 8/2001 | Munshi | 607/1 |
| 2005/0263845 A1* | 12/2005 | Saito et al. | 257/516 |

FOREIGN PATENT DOCUMENTS

| | | |
|---|---|---|
| JP | 04-163042 | 6/1992 |
| JP | 04167413 A * | 6/1992 |
| JP | 5-4446 U | 1/1993 |
| JP | 5-11430 U | 2/1993 |
| JP | 05-109583 A | 4/1993 |
| JP | 06-251991 | 9/1994 |
| JP | 2003077753 A * | 3/2003 |
| JP | 2004-350400 A | 12/2004 |
| JP | 2005-093516 A | 4/2005 |
| JP | 2005-093761 | 4/2005 |
| JP | 2005-112017 A | 4/2005 |
| JP | 2005-264959 A | 9/2005 |
| JP | 2005-264960 A | 9/2005 |
| WO | WO 2004053902 A1 * | 6/2004 |

OTHER PUBLICATIONS

Definition of the Ellipse.*

International Search Report Dated Jul. 11, 2006.

* cited by examiner

FIG. 15
"Prior Art"

| Sectional shape | Width | Volumetric efficiency of element |
|---|---|---|
| S1 Circular shape | 250 ⊚⊚⊚⊚⊚⊚⊚⊚⊚⊚ | 67% |
| S3 Elliptical shape | 200 | 91% |
| S3 Large elliptical shape | 185 | 97% |
| S4 Laminated shape (large ring is cut) | 200 | 94% |

METALIZED FILM CAPACITOR, CASE MOLD TYPE CAPACITOR USING THE SAME, INVERTER CIRCUIT, AND VEHICLE DRIVE MOTOR DRIVE CIRCUIT

TECHNICAL FIELD

This application is a U.S. National Phase Application of PCT International Application PCT/JP2006/307467.

The present invention relates to a metalized film capacitor used in various electrical equipments, industrial application, electric power, and the like, and particularly suitable for vehicle-mounted applications, a case mold type capacitor using the same, and an inverter circuit and a vehicle drive motor drive circuit.

BACKGROUND ART

Recently, in a car industry, environmental friendly technologies have been developed actively. For example, hybrid electric vehicles run by an electric motor and an engine (hereinafter, referred to as "HEV") have been introduced in a market. An electric motor system for HEV has a high working voltage region such as several hundreds volts. Therefore, as capacitors used for such electric motor systems, metalized film capacitors having a high withstand voltage and excellent electric characteristics have been used.

FIG. 14A is a developed perspective view showing a configuration of a conventional metalized film capacitor of this kind; and FIG. 14B is a sectional view showing a part of a dielectric film thereof.

As shown in FIG. 14A, dielectric film 410 is made of, for example, polypropylene (PP) and has metal vapor-deposited electrode 411 on one principal surface thereof. Dielectric film 410 has non metal vapor-deposited portion 412, which is an exposed portion of dielectric film 410, in the longitudinal direction of one end in the width direction of dielectric film 410. With such a configuration, a metalized film is formed. A pair of such metalized films is wound in a state in which metal vapor-deposited electrodes 411 face each other with dielectric film 410 interposed therebetween, and metal sprayed electrode 413 is formed by thermal spraying zinc onto both edge faces.

Prior art information relating to the invention of this application includes, for example, Japanese Patent Unexamined Publications No. H4-163042 and No. 2005-93761.

However, in the above-mentioned conventional metalized film capacitor, the general capacitance range is from 0.1 to 50 µF, and the use temperature range is about −10° C. to +75° C. Meanwhile, the capacitance required for HEV is not less than several hundreds µF and the use temperature range is not less than from −40° C. to +90° C. The conventional capacitor cannot be used as it is for HEV.

Furthermore, since capacitance per unit element of a metalized film capacitor is about one hundred and several tens µF, in order to obtain about not less than several hundreds µF of capacitance, a plurality of metalized film capacitors may be connected in parallel. However, when the number of elements is increased, there are problems that cost rises and reliability is reduced.

If capacitance of one element can be considerably increased to be several hundreds µF, the number of elements can be reduced and metalized film capacitors for HEV can be produced stably and at a low cost.

Note here that capacitance C of the above-mentioned metalized film capacitor is expressed by the equation: $C = \in \times (S/d)$ ($\in$: dielectric constant, S: electrode area, and d: distance between electrodes).

When the thickness of a film as a dielectric substance is determined from the withstand voltage and the like, in order to increase the capacitance, it is necessary that an area of the electrode be increased, that is, the number of metalized films be increased. In this case, naturally, the shape of the element must be enlarged. When the shape of the element is enlarged, a displacement amount due to thermal expansion and contraction is increased. Furthermore, since the guaranteed temperature range in vehicle-mounted capacitor is wider than the general one by 45° C. or more, the displacement amount due to thermal expansion and contraction is further increased.

In general, a metalized film capacitor includes a metal sprayed electrode having relatively small thermal contraction and an organic matter based dielectric film having relatively large thermal contraction. Consequently, a portion in which the metal sprayed electrode and the film are brought into contact with each other is the most susceptible to thermal stress. Therefore, when the shape of the capacitor is enlarged and the use temperature range is further widened, the thermal stress is increased. As a result, the state in which the metal sprayed electrode and the film are brought into contact with each other is further deteriorated. Due to this deterioration, electrical loss (tan δ) that is one of the electrical characteristics of a capacitor may be deteriorated. In general, it is desirable that the increase in tan δ is not more than 50% with respect to the initial value.

Furthermore, in this kind of metalized film capacitors, in addition to increasing of a capacitance per unit element, there has been a strong demand for reducing the size of equipment or power supply unit to be used and making the capacitor have a small and thin size from a restriction such as an mounting area on a printed wiring board. That is to say, in order to achieve a large capacity and allow a capacitor element to be contained in limited space, the element must be further flattened.

FIG. 15 shows preliminary calculated volumetric efficiencies when capacitor elements having the same capacity are contained in each case having the same height and depth. FIG. 15 respectively shows a plurality of capacitor elements whose sectional shape is circular (S1), a plurality of capacitor elements whose sectional shape is elliptical (S2), one large elliptical shaped capacitor element obtained by enlarging and flattening the elliptical elements (S3), and two laminated elements obtained by winding an element with a large diameter and cutting it into two (S4). As is apparent from FIG. 15, it is shown that a large elliptical element shown by reference mark S3 exhibits the most excellent volumetric efficiency (97%). When only a volumetric efficiency of the element is considered, a laminated capacitor in which rectangular shaped films are laminated can provide a volumetric efficiency that is almost 100%. However, it is not easy to produce a large laminated capacitor by laminating thin films and cutting them. Furthermore, there is a problem as to withstand voltage and it is known that the intended withstand voltage per unit thickness cannot be achieved.

However, when the large elliptical capacitor element shown in S3 in the above is produced, a method of producing a large circular capacitor element and then flattening thereof is the most suitable to mass production. In this case, the strength of a winding core is important. When the thickness of materials of the winding core is thick and the strength is too strong, it is difficult to pull out a holding jig (not shown).

Furthermore, as shown in FIG. 16, in addition to the difficulty in flattening, there arises a problem that winding core 400C is returned to the original state after flattening, so that the capacitor element is swollen in the direction of 400D.

On the contrary, when the thickness of the material of the winding core is too thin and the strength is too weak, after the film is wound, a part of the winding core moves together with the winding core holding jig when the winding core holding jig is pulled out. As a result, as shown in FIG. 17, portion 400Q is protruded from end surface 400T. Furthermore, after processing, as shown in FIG. 18, for example, wrinkles 400W are generated in winding core 400C as the capacitor element returns to the original state in direction 400D. Thus, the capacitor element that has been processed in a flat shape becomes weak in strength and a desired shape cannot be maintained.

Furthermore, a metalized film capacitor as a single unit has a low humidity resistance property. Therefore, in order to dissolve this problem, a case mold type capacitor, in which a capacitor element is contained in a case and resin is cast into the case, has been developed and practically used. When a large capacity is required, a case mold type capacitor in which a plurality of capacitor elements are connected in parallel has been developed and practically used.

SUMMARY OF THE INVENTION

The present invention provides a metalized film capacitor that achieves a large capacity and a small and thin size, improves volumetric efficiency, and has an excellent productivity and reliability. Furthermore, the present invention provides a metalized film capacitor capable of exhibiting a stable performance in a wide temperature range, a case mold type capacitor using the same, an inverter circuit and a vehicle drive motor drive circuit.

The metalized film capacitor of the present invention includes metalized films. The metalized film includes a dielectric film made of an organic polymer material, for example, polypropylene, and a metal vapor-deposited electrode formed on the dielectric film so that a non metal vapor-deposited portion that is an exposed portion of the dielectric film is continuously left in the longitudinal direction of one end in the width direction of the dielectric film. The metalized film is configured so that non metal vapor-deposited portions are disposed in the opposite direction to each other. Furthermore, dielectric films are wound or laminated so as to be formed into an elliptical sectional shape having a linear portion and a curve portion so that a pair of metal vapor-deposited electrodes face each other with the dielectric film interposed therebetween in a state in which they are shifted by a predetermined dimension so as to widen in the width direction. In the metalized film capacitor, both end faces are provided with electrodes. In such a metalized film capacitor, the sectional shape is an elliptical shape. In the elliptical shape, the dimension of the major axis is denoted by "a" and the dimension of the minor axis is denoted by "b". When major axis "a" is not less than 60 mm and less than 100 mm, the dimension shifted in the width direction is not less than 1.2 mm. Furthermore, when major axis "a" is not less than 100 mm and less than 120 mm, the dimension shifted in the width direction is not less than 1.3 mm, and when major axis "a" is not less than 120 mm, the dimension shifted in the width direction is not less than 1.4 mm.

In the metalized film capacitor in accordance with the present invention, by increasing the dimension in which the pair of metalized films is shifted in the width direction, a bonding state between the metal vapor-deposited electrode and electrodes formed on the end surface thereof is maintained stable. Therefore, even if the use temperature range is widened and the thermal stress is increased, a stable contact state between the metal sprayed electrode and the film can be maintained. The deterioration of tan $\delta$ can be suppressed and excellent electric performance can be maintained.

Furthermore, the metalized polypropylene film capacitor in accordance with the present invention has major axis "a" of 60 mm or more and the ratio "a/b", that is, the flattening ratio of 3 or more. It uses a winding core produced by winding, 5 to 10 turns, a polypropylene film having a thickness that is 3 to 10 times as thick as the thickness of the dielectric film constituting the metalized film. The dimension from this winding core to the outer circumferential surface of the capacitor element is made to be not more than 14 mm.

As mentioned above, in the metalized film capacitor in accordance with the present invention, even when the flattening ratio of the capacitor element having an elliptical sectional shape is increased and a large capacity is achieved, it is possible to set the strength of the winding core to be an suitable value. Therefore, it is possible to obtain an effect of realizing a metalized film capacitor that achieves a large capacity and a small and thin size, improves volumetric efficiency, and has an excellent productivity and reliability.

Furthermore, the present invention relates to a case mold type capacitor obtained by connecting at least one metalized film capacitor element by using a bus bar having a terminal portion for external connection in one end thereof, placing it in the case, and resin-molding it except at least a terminal portion of the bus bar.

In the present invention, a metalized film capacitor is applied to a case mold type capacitor as well as an inverter circuit and a vehicle drive motor drive circuit.

BRIEF DESCRIPTION OF THE DRAWINGS

FIG. 15 is a conceptual diagram for preliminary calculating a volumetric efficiency of shapes of conventional capacitor elements.

Figure 1:
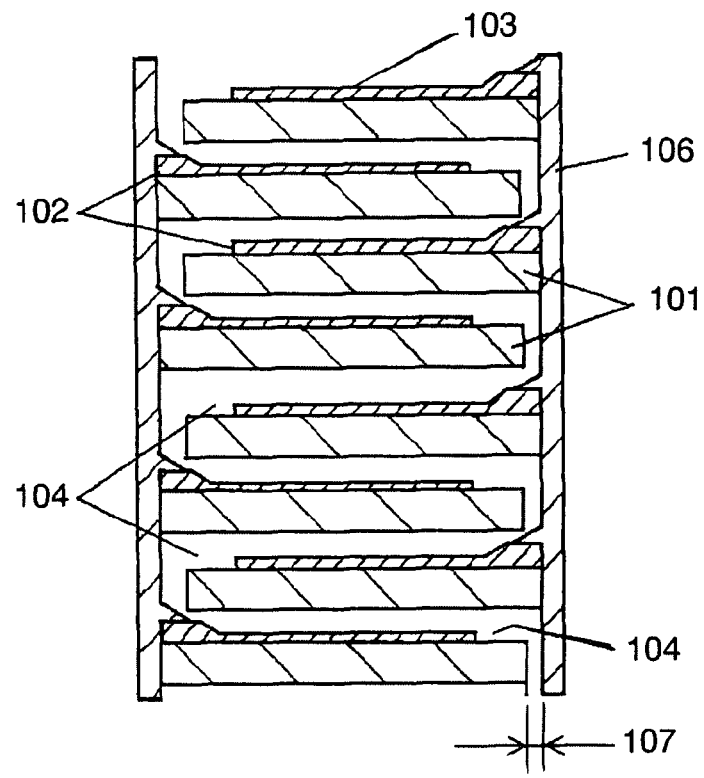
FIG. 1 is a sectional view showing a configuration of a metalized film capacitor in accordance with a first exemplary embodiment of the present invention.

REFERENCE MARKS IN THE DRAWINGS 101 dielectric film
102 metal vapor-deposited electrode
103, 206 metalized film
104 margin
105 slit
106 metal sprayed electrode
107 offset
201 metalized film capacitor element
201a P (Positive) pole electrode
201b N (Negative) pole electrode
202 P pole bus bar
202a, 203a soldering portion
202b P pole terminal
203 N pole bus bar
203b N pole terminal
204 case
205, 304, 305 winding core
305a heat sealing
a major axis
b minor axis

DETAILED DESCRIPTION OF THE PREFERRED EMBODIMENTS

First Exemplary Embodiment

Figure 2A:
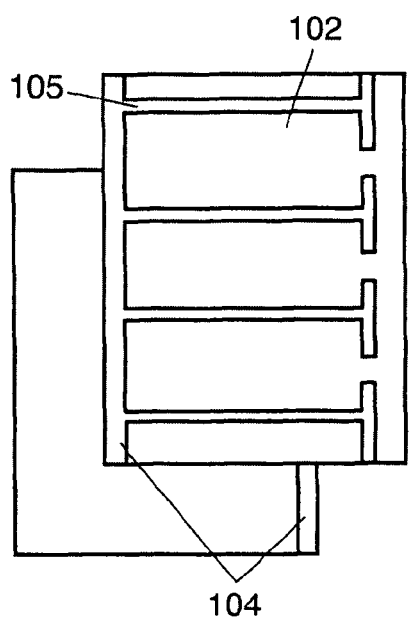
FIG. 2A is a plan view showing a metalized film used in a metalized film capacitor in accordance with the first exemplary embodiment of the present invention.
Figure 2B:
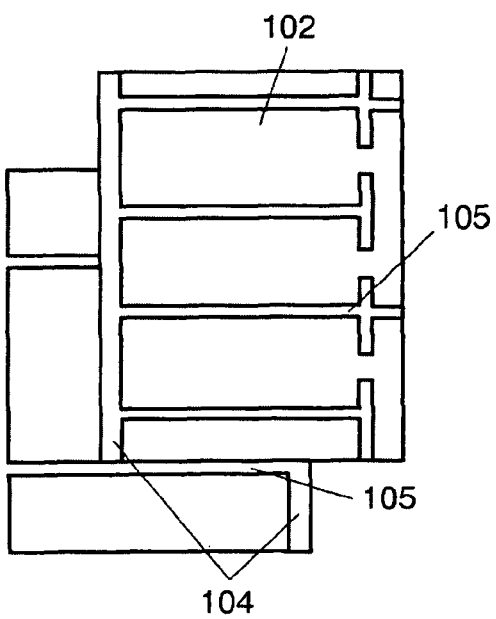
FIG. 2B is a plan view showing a metalized film used in a metalized film capacitor in accordance with the first exemplary embodiment of the present invention.

FIG. 1 is a sectional view showing a configuration of a metalized film capacitor in accordance with a first exemplary embodiment of the present invention; FIGS. 2A and 2B are plan views showing a metalized film used in the metalized film capacitor; and FIG. 3 is a perspective view showing a structure of the metalized film capacitor.

Figure 3:
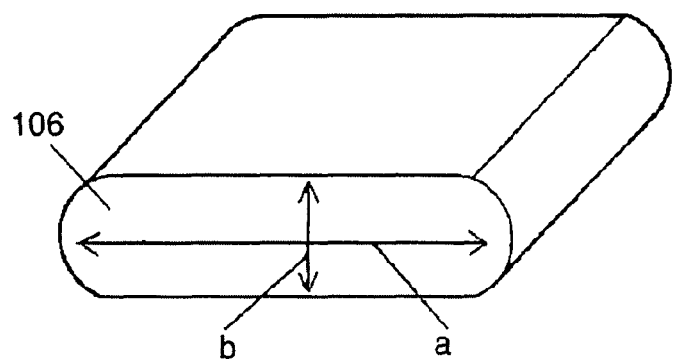
FIG. 3 is a perspective view showing a structure of the metalized film capacitor in accordance with the first exemplary embodiment of the present invention.

In FIGS. 1 to 3, on the surface of dielectric film 101 made of one of organic polymer materials, for example, polypropylene, metal vapor-deposited electrode 102 is formed by, for example, vacuum metallizing. Thus, metalized film 103 is formed. On the surface of dielectric film 101, margin 104 in which metal vapor-deposited electrode 102 is not formed is provided. Margin 104 is continuously formed at the side of one end of dielectric film 101 in the longitudinal direction. Furthermore, slit 105 is provided in which metal vapor-deposited electrode 102 is not formed so as to expose dielectric film 101. Slits 105 are formed at appropriately equal intervals in the width direction of dielectric film 101, thus forming divided electrodes.

FIG. 2A shows metal vapor-deposited electrode 102 that is divided by slit 105 and connected in the longitudinal direction. FIG. 2B shows metal vapor-deposited electrode 102 that is divided in the longitudinal direction by slit 105. Furthermore, FIGS. 2A and 2B show that margin 104 is formed.

Metal sprayed electrodes 106 shown in FIG. 1 are formed by thermal spraying zinc metal onto both end surfaces of the element, respectively. Offset 107 shows a shift amount when metalized films 103 are superimposed in a way in which margins 104 come in opposite directions to each other. Insulating property is secured by providing offset 107.

Then, the thus superimposed metalized films 103 are wound and then pressed so as to be an elliptical shape having a sectional shape with a linear portion and a curved portion. Thus, molded product having a shape shown in FIG. 3 is obtained. FIG. 3 shows a metalized film capacitor having an elliptical sectional shape with major axis "a" and minor axis "b". Thus, the metalized film capacitor is configured. Hereinafter, specific Examples are described.

Example 1

In Example 1, by using 3.1 μm-thick polypropylene (PP) metalized film 103, a metalized film capacitor element having capacitance of 120 μF and an elliptical sectional shape with major axis "a" of 62 mm and minor axis "b" of 16 mm is produced. Offset 107 (see FIG. 1) that is a shift amount of metalized film 103 constituting this element is set to 1.2 mm. As metalized film 103, a type that is not completely divided shown in FIG. 2A is employed.

A lead terminal is connected to the thus produced metalized film 103 and a metalized film capacitor is produced. The metalized film capacitor is placed in a case made of PPS resin (Sasteel P-60 manufactured by Tosoh Corporation, containing 40% glass fiber) and sealed with epoxy resin (EC285 manufactured by Sanyu Rec Co., Ltd.). Thus, a case mold type capacitor is produced.

Example 2

Example 2 is carried out the same as in Example 1 except that offset 107 (see FIG. 1) is set to 1.5 mm.

Example 3

Example 3 is carried out the same as in Example 1 except that offset 107 is set to 1.0 mm.

Example 4

In Example 4, by using 3.1 μm-thick polypropylene (PP) metalized film 103, a metalized film capacitor having capacitance of 250 μF and an elliptical sectional shape with major axis "a" of 100 mm and minor axis "b" of 21 mm is produced. Offset 107 is set to 1.4 mm. As metalized film 103, a type that is not completely divided shown in FIG. 2A is employed.

A lead terminal is connected to the thus produced metalized film 103 and a metalized film capacitor is produced. The metalized film capacitor is placed in a case made of PPS resin (Sasteel P-60 manufactured by Tosoh Corporation, containing 40% glass fiber) and sealed with epoxy resin (EC285 manufactured by Sanyu Rec Co., Ltd.). Thus, a case mold type capacitor is produced.

Example 5

Example 5 is carried out the same as in Example 4 except that offset 107 is set to 1.8 mm.

Example 6

Example 6 is carried out the same as in Example 4 except that offset 107 is set to 1.3 mm and a type in which a metal vapor-deposited electrode is divided in the width of 15 mm by slits 105 in the width direction is used as metalized film 103.

Example 7

Example 7 is carried out the same as in Example 4 except that offset 107 is set to 1.2 mm.

Example 8

In Example 8, by using 3.1 μm-thick polypropylene (PP) metalized film 103, a metalized film capacitor element having capacitance of 320 μF and an elliptical sectional shape with major axis "a" of 120 mm and minor axis "b" of 22 mm is produced. Offset 107 that is a shift amount of metalized film 103 constituting this element is set to 1.5 mm. As metalized film 103, a type that is not completely divided shown in FIG. 2A is employed.

A lead terminal is connected to the thus produced metalized film 103 and a metalized film capacitor is produced. The metalized film capacitor is placed in a case made of PPS resin (Sasteel P-60 manufactured by Tosoh Corporation, containing 40% glass fiber) and sealed with epoxy resin (EC285 manufactured by Sanyu Rec Co., Ltd.). Thus, a case mold type capacitor is produced.

Example 9

Example 9 is carried out the same as in Example 8 except that a type in which a metal vapor-deposited electrode is divided in the width of 15 mm by slit 105 shown in FIG. 2B is used as metalized film 103.

Example 10

Example 10 is carried out the same as in Example 8 except that offset 107 that is a shift amount of metalized film 103 is set to 1.3 mm.

Comparative Example 1

Comparative Example 1 has a conventional configuration for comparison with the case mold type capacitor of the present invention. Comparative Example 1 is carried out the same as in Example 1 except that offset 107 that is a shift amount of the metalized film is set to 1.0 mm, major axis "a" is set to 46 mm and minor axis "b" is set to 23 mm.

Figure 4:
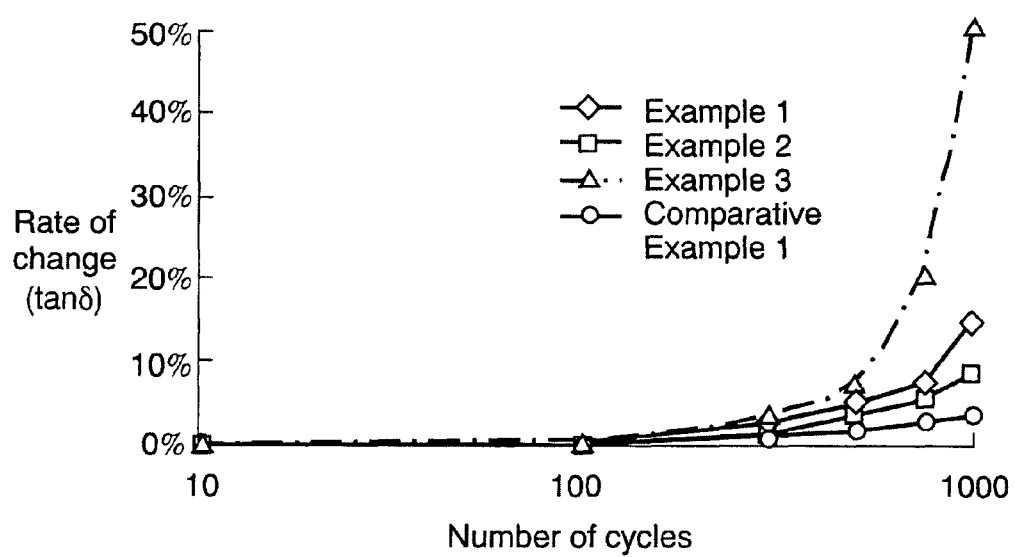
FIG. 4 is a characteristic graph showing the rate of change of tan $\delta$ in the thermal shock test of the metalized film capacitor in accordance with the first exemplary embodiment of the present invention.
Figure 5:
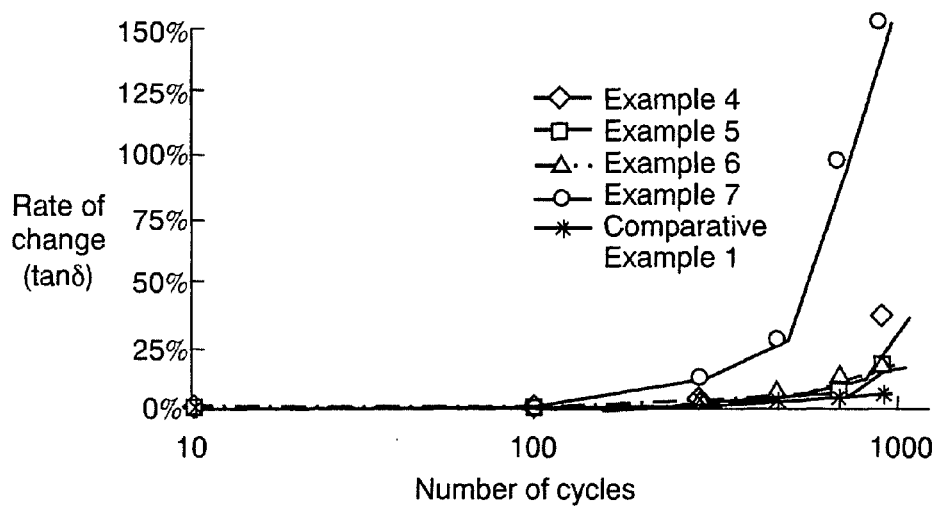
FIG. 5 is a characteristic graph showing the rate of change of tan $\delta$ in the thermal shock test of the metalized film capacitor in accordance with the first exemplary embodiment of the present invention.
Figure 6:
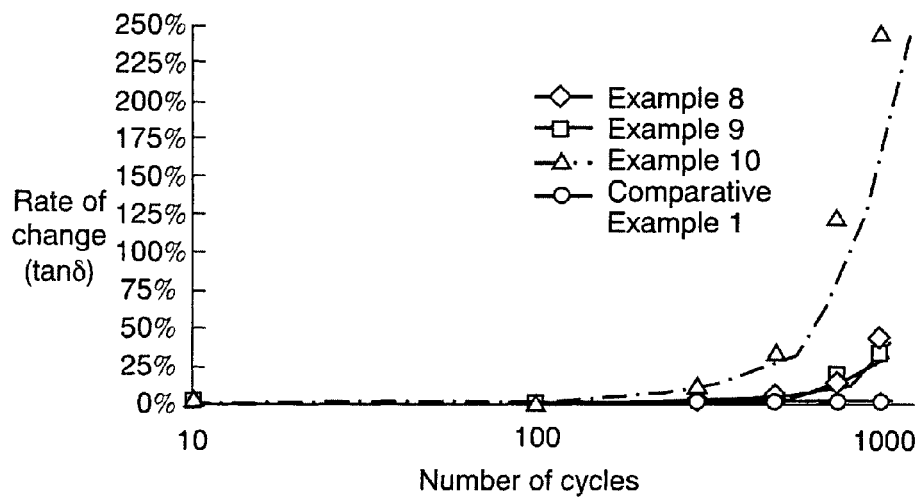
FIG. 6 is a characteristic graph showing the rate of change of tan $\delta$ in the thermal shock test of the metalized film capacitor in accordance with the first exemplary embodiment of the present invention.

The metalized film capacitors that are obtained in Examples 1 to 10 and Comparative Example 1 are subjected to a thermal shock test. The test results of the rate of change of tan δ are shown in FIGS. 4 to 6. The thermal shock test is carried out in a way in which one cycle is carried out for two hours each at a temperature of −40° C. to +95° C. The number of capacitors to be tested is three and the average value thereof is obtained.

As is apparent from FIGS. 4 to 6, in Example 1, the rate of change of tan δ is small even after 1000 cycles of tests and is not more than 20% with respect to the initial value.

Furthermore, in Example 2 in which offset 107 is increased, the rate of change of tan δ is not more than 10% even after 1000 cycles of tests. It is shown that by increasing offset 107, the rate of change of tan δ is reduced.

On the contrary, in Example 3 in which offset 107 is small, the rate of change of tan δ is large as about 50%. In Comparative Example 1 in which the dimension at the major axis side is small, it is shown that the change of tan δ is hardly observed.

Furthermore, in Example 4, the rate of change of tan δ after 1000 cycles of tests is about 35% with respect to the initial value. In Example 5 in which offset 107 is increased, the rate of change of tan δ after 1000 cycles of tests is about 15%. Furthermore, it is shown that in the case where the length at the side of the major axis of the elliptically formed metal sprayed electrode is long, by increasing offset 107, an excellent result can be obtained.

One of the factors of the increase in tan δ is thought to be that metal vapor-deposited electrodes are continued in the longitudinal direction even when the contact strength between the metal sprayed electrode and the vapor-deposited electrode is reduced. In Example 6, since the metal vapor-deposited electrode is divided by slits in the width direction, the deteriorated portion in the contact between the metal sprayed electrode and the dielectric film is separated, so that the increase in tan δ is suppressed. Furthermore, in Example 7 in which offset 107 is small, it is shown that the rate of change of tan δ after 1000 cycles of tests is large as about 150%.

Furthermore, in Example 8, the rate of change of tan δ after 1000 cycles of tests is about 35% with respect to the initial value. In Example 9, since the metal vapor-deposited electrode is divided by slits 105 in the width direction, the deteriorated portion of the contact between the metal sprayed electrode and the dielectric film is separated, so that the increase in tan δ is suppressed. Furthermore, in Example 10 in which offset 107 is small, it is shown that the rate of change of tan δ after 1000 cycles of tests becomes large as about 150%.

The metalized film capacitor in accordance with the present invention has an elliptically formed sectional shape. In the metalized film capacitor in which this elliptical sectional shape has major axis "a" of not less than 60 mm, by increasing offset 107 that is an amount of shifting a pair of metalized films in the width direction, the bonding state between the metal vapor-deposited electrode and the metal sprayed electrode formed on the end surface becomes stable. Therefore, even if the use temperature range is widened and the thermal stress is increased, the contact state between the metal sprayed electrode and the dielectric film is maintained stable, so that tan δ is not increased. Thus, excellent performance can be maintained.

Therefore, by using the thus formed metalized film capacitor in accordance with the present invention, a case mold type capacitor is configured. Furthermore, when this case mold type capacitor is used for smoothing an inverter circuit or for smoothing a drive circuit of a vehicle drive motor, the performance can be exhibited satisfactorily.

The first exemplary embodiment describes the case where the sectional shape of the metalized film capacitor is elliptical. However, the present invention is not particularly limited to this, when the sectional shape is oval or circular, the same effect can be obtained.

Furthermore, the case where a polypropylene (PP) film is used as a dielectric film is described. However, the present invention is not limited to this. The dielectric film may be made of organic polymer materials such as a polyethylene terephthalate film, a polystyrene sulfide film, or the like.

An example of the metal vapor-deposited electrode formed on the dielectric film may include aluminum and zinc, aluminum, silver and zinc, and the combination thereof.

Furthermore, an example of the metal to be sprayed for the metal sprayed electrode is not particularly limited to an alloy of zinc and tin, and any other alloys may be used as long as the alloy includes zinc as a main component.

Second Exemplary Embodiment

Hereinafter, Second Exemplary Embodiment is described.

Figure 7A:
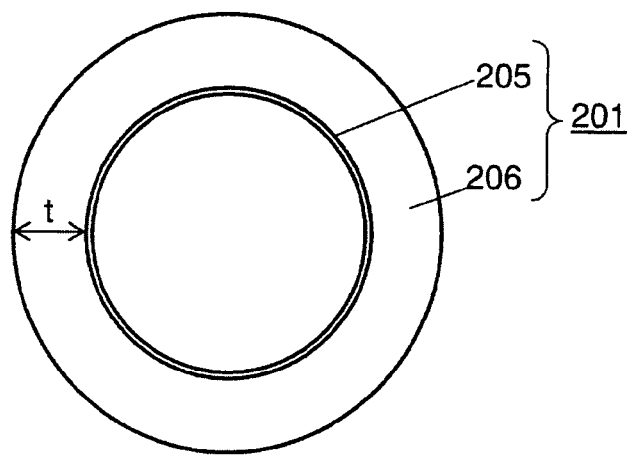
FIG. 7A is a front view showing a capacitor element constituting a metalized film capacitor element in accordance with a second exemplary embodiment of the present invention.
Figure 7B:
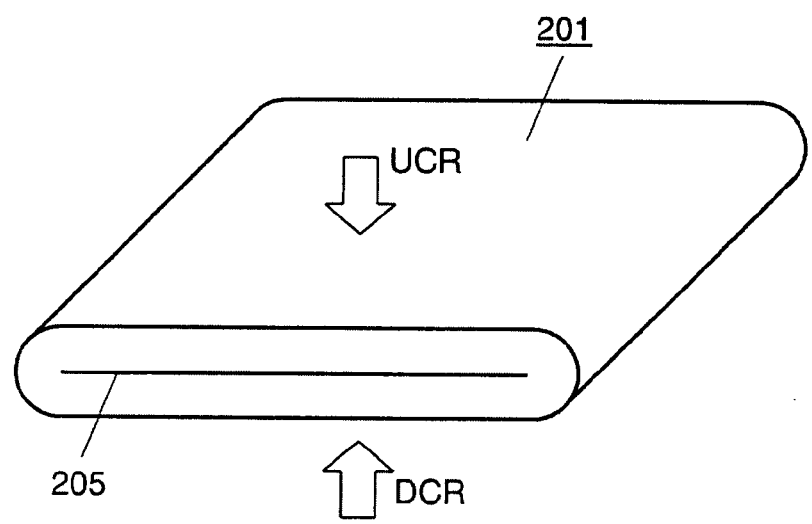
FIG. 7B is a perspective view showing the capacitor element constituting the metalized film capacitor element in accordance with the second exemplary embodiment of the present invention.

FIGS. 7A and 7B are a front view and a perspective view showing a capacitor element constituting metalized film capacitor element 201, respectively. FIGS. 7A and 7B show winding core 205 and metalized film 206 including a dielectric film made of poly polypropylene and a metal vapor-deposited film formed thereon. A capacitor element is configured by winding metalized film 206 around the outer surface of winding core 205 in a state in which it is maintained by using a winding core holding jig (not shown) and then pulling out the winding core holding jig (not shown) out from winding core 205. The symbol t in FIG. 7A denotes a dimension from the winding core 205 to the outer circumferential surface of the capacitor element 201.

The capacitor element in accordance with the second exemplary embodiment is obtained by winding the film cylindrically as shown in FIG. 7A, and then, the wound film is pressed by crushing processing from upward direction UCR and downward direction DCR so as to flatten the capacitor.

Figure 10A:
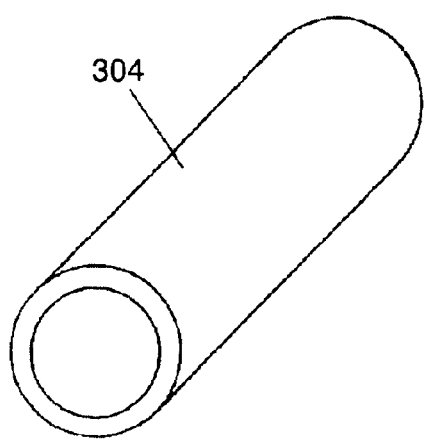
FIG. 10A is a perspective view showing a configuration of a winding core used in a metalized film capacitor in accordance with the second exemplary embodiment of the present invention.
Figure 10B:
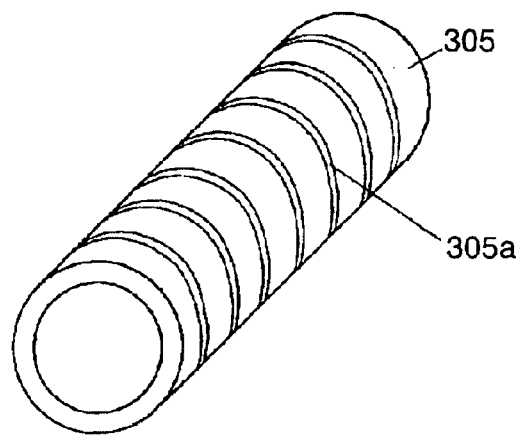
FIG. 10B is a perspective view showing a configuration of another winding core used in a metalized film capacitor in accordance with the second exemplary embodiment of the present invention.

FIGS. 10A and 10B are perspective views showing a configuration of the winding core used in a metalized film capacitor in accordance with the second exemplary embodiment of the present invention. FIG. 10A shows a winding core that is not provided with a heat sealing; and FIG. 10B shows a winding core that is provided with a heat sealing.

In FIGS. 10A and 10B, winding cores 304 and 305 are made of a polypropylene film that is the same material as that of the dielectric film forming the metalized film and have the thickness that is 3 to 10 times as thick as that of the dielectric film, and wound 5 to 10 turns. In FIG. 10B, heat sealing 305a, which is formed by welding the end portion thereof, is provided. Hereinafter, specific Examples are described.

Examples 1-1

A winding core is formed by winding core film that is a 10.5 μm-thick polypropylene film 10 turns, and by welding the end portion so as to form a heat sealing. The appearance of this capacitor element and a time for reaching 5% capacity reduction in the life test at the time of allowing a current to flow at 90° C., 600V and 300 A rms is measured and evaluated. The evaluation results for respective Examples are shown in Table 1 together with the winding core specification.

TABLE 1

| Ex* | *1 (μm) | Turns (time) | *2 | Capacitance (μF) | a/b | *3 a (mm) | b/2 (mm) | *4 | *5 (h) | *6 |
|---|---|---|---|---|---|---|---|---|---|---|
| 1-1 | 10.5 | 10 | Y | 150 | 5 | 78.4 | 7.8 | A | 4500 | A |
| 1-2 | 12 | 8 | Y | 150 | 5 | 78.4 | 7.8 | A | 4700 | A |
| 1-3 | 18 | 8 | Y | 150 | 5 | 78.4 | 7.8 | A | 5300 | A |
| 1-4 | 35 | 5 | Y | 150 | 5 | 78.4 | 7.8 | A | 4500 | A |
| 1-5 | 18 | 8 | N | 150 | 5 | 78.4 | 7.8 | B*7 | 3900 | B |
| 1-6 | 3 | 30 | Y | 150 | 5 | 78.4 | 7.8 | C*8 | 2500 | C |
| 1-7 | 38 | 5 | Y | 150 | 5 | 78.4 | 7.8 | B*9 | 3500 | B |
| 2-1 | 18 | 8 | Y | 150 | 3.5 | 65.9 | 9.4 | A | 5400 | A |
| 2-2 | 100 | 1 | Y | 150 | 3.5 | 65.9 | 9.4 | C*10 | 2200 | C |
| 3-1 | 18 | 8 | Y | 150 | 3 | 61.2 | 10.2 | A | 5400 | A |
| 3-2 | 100 | 1 | Y | 150 | 3 | 61.2 | 10.2 | C*10 | 2300 | C |
| 3-3 | 250 | 1 | N | 150 | 3 | 61.2 | 10.2 | C*10 | 2200 | C |

Ex*: Examples
*1: Thickness of winding core film
*2: Presence or absence of heat sealing TABLE 1-continued

|    | *1   | Turns  |    | Capac- |     |      | *3   |    | *5  |    |
|    | (μm) | (time) | *2 | itance | a/b | a    | b/2  | *4 | (h) | *6 |
| Ex*|      |        |    | (μF)   |     | (mm) | (mm) |    |     |    |

Y: Heat sealing is provided
N: Heat sealing is not provided
*3: Dimension from winding core to outer circumferential surface of element
*4: Appearance of element
*5: Time for reaching 5% capacity reduction in the life test at the time of allowing a current to flow at 90° C., 600 V and 300 Arms
*6; Total evaluation
A: ○ (good), B: Δ (good to bad), C: × (bad)
B*7: Wrinkles are generated in the vicinity of the winding core
C*8: Protrusion is observed in winding core
B*9: Small swelling
C*10: Large swelling Example 1-2

Example 1-2 is carried out as in Example 1-1 except that a polypropylene film having a thickness of 12 μm is wound eight turns.

Example 1-3

Example 1-3 is carried out as in Example 1-1 except that a polypropylene film having a thickness of 18 μm is wound eight turns.

Example 1-4

Example 1-4 is carried out as in Example 1-1 except that a polypropylene film having a thickness of 35 μm is wound five turns.

Example 1-5

Example 1-5 is carried out as in Example 1-1 except that a polypropylene film having a thickness of 18 μm is wound eight turns and that a heat sealing is not provided.

Example 1-6

Example 1-6 is carried out as in Example 1-1 except that a polypropylene film having a thickness of 3 μm is wound 30 turns.

Example 1-7

Example 1-7 is carried out as in Example 1-1 except that a polypropylene film having a thickness of 38 μm is wound five turns.

Example 2-1

A polypropylene film having a thickness of 18 μm is wound eight turns and the end portion is welded so as to form a heat sealing. Thus, a winding core provided with a heat sealing is produced. By using this winding core, the same capacitor element as in Example 2 is produced.

Example 2-2

Example 2-2 is carried out as in Example 2-1 except that a polypropylene film having a thickness of 100 μm is wound one turn.

Example 3-1

A polypropylene film having a thickness of 18 μm is wound eight turns and the end portion is welded so as to form a heat sealing. Thus, a winding core provided with a heat sealing is produced. By using this winding core, the same capacitor element as in Example 3 is produced.

Example 3-2

Example 3-2 is carried out as in Example 3-1 except that a polypropylene film having a thickness of 100 μm is wound one turn.

Example 3-3

Example 3-3 is carried out as in Example 3-1 except that a polypropylene film having a thickness of 250 μm is wound one turn and that a heat sealing is not provided.

As is apparent from Table 1, in Example 1-6 in which a polypropylene film constituting a winding core having a thickness of 3 μm is used, since the strength of the winding core is too weak, when a winding core holding jig is pulled out, a part of the winding core protrudes together with the winding core holding jig. Thus, not only the appearance is affected but also the capacity reducing rate is increased.

Furthermore, also in Example 1-5 in which a polypropylene film constituting a winding core having a thickness of 18 μm is used, when an end portion is not welded (a heat sealing is not provided), since the strength of the winding core is low, wrinkles are generated in the winding core. Therefore, not only the appearance is affected but also the capacity reducing rate is increased.

On the other hand, in Example 1-7 in which a polypropylene film constituting a winding core having a thickness of 38 μm is used, since the strength of the winding core is too strong, it returns to the original state after flattening processing is carried out, thus causing swelling. Furthermore, not only the appearance is affected but also the capacity reducing rate is increased. In Examples 2-2, 3-2 and 3-3 in which the thickness of the polypropylene film is set to 100 μm and 250 μm, this phenomenon is remarkably observed.

From the above-mentioned results, it is most preferable that a winding core used in the metalized film capacitor in accordance with the second exemplary embodiment is configured by winding a polypropylene film, in which the thickness of the dielectric film is increased to 3 to 10 times, 5 to 10 turns.

Furthermore, it is preferable that a heat sealing is provided by welding the end portion of the thus configured winding core because the strength of the winding core is improved. Furthermore, it is more preferable that a plurality of concave portions are provided on this heat sealing because more stable strength can be obtained.

Furthermore, a metal vapor-deposited electrode formed on the dielectric film is provided with divided electrodes, and these divided electrodes are connected in parallel by fuse. Thereby, a self protective function is provided. Thus, a metalized film capacitor having a further high function can be realized.

Thus, the metalized film capacitor in accordance with the present invention has an advantage that a large capacity and a small and thin size can be achieved and the volumetric efficiency is improved. Moreover, it is possible to achieve an effect of obtaining excellent productivity and reliability. Therefore, when a large capacity is obtained, the number of capacitor elements can be reduced so as to reduce the dead space and further the number of soldering points can be reduced. Therefore, the man-hour can be reduced so as to reduce the cost.

Third Exemplary Embodiment

Figure 11:
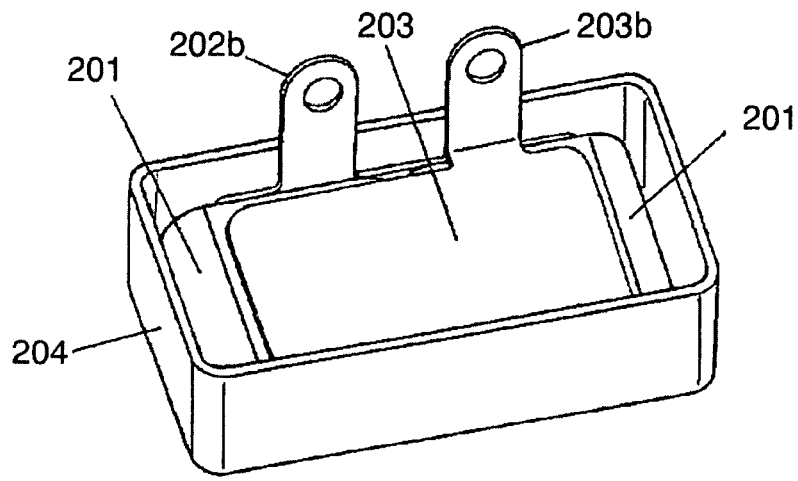
FIG. 11 is a perspective view showing a configuration of a case mold type capacitor in accordance with a third exemplary embodiment of the present invention.
Figure 12:
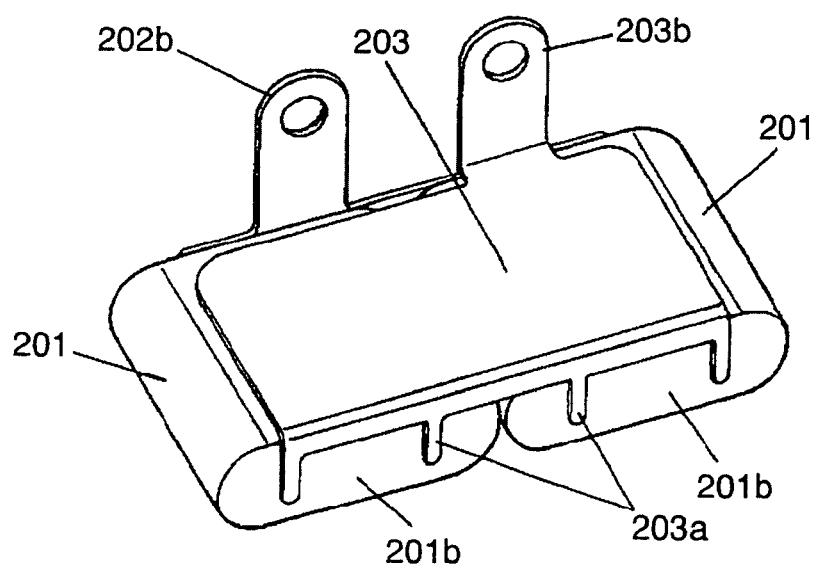
FIG. 12 is a perspective view showing a case mold type capacitor before molding in accordance with the third exemplary embodiment of the present invention.
Figure 13:
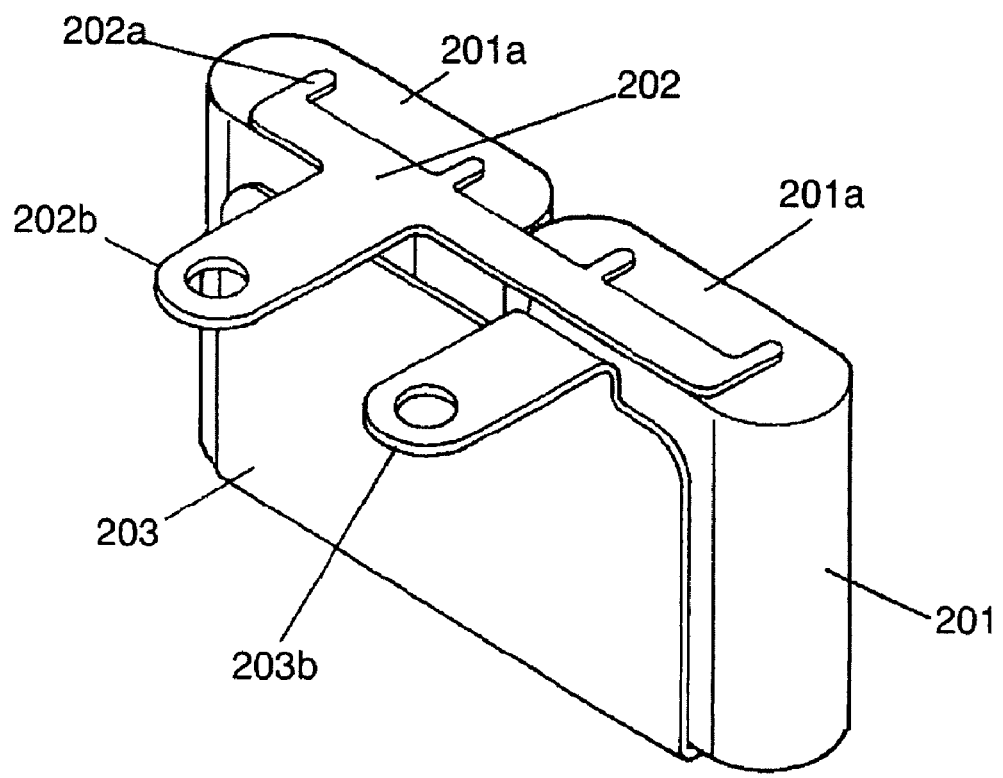
FIG. 13 is a perspective view showing a case mold type capacitor before molding in accordance with the third exemplary embodiment of the present invention.
Figure 14A:
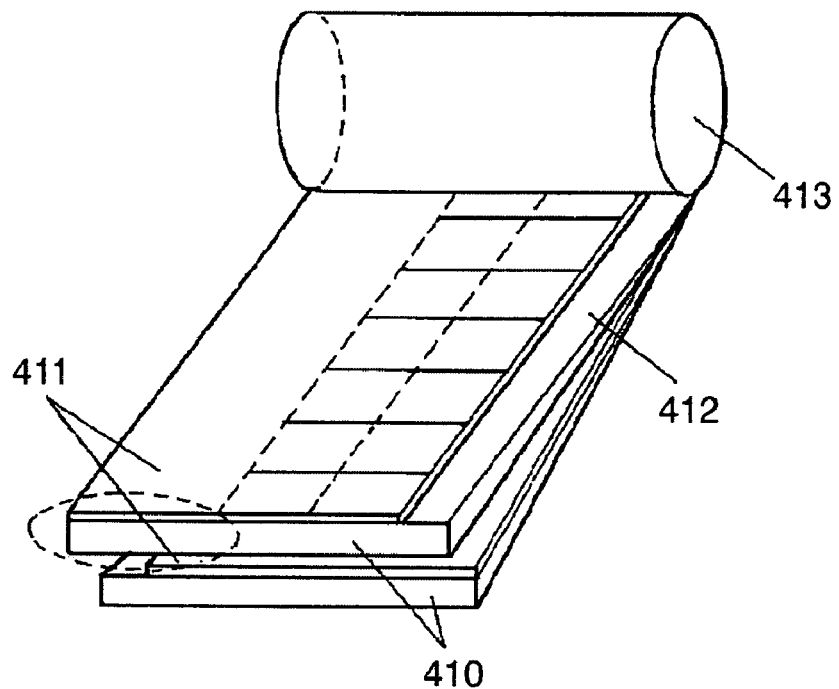
FIG. 14A is a developed perspective view showing a configuration of a conventional metalized film capacitor.
Figure 14B:
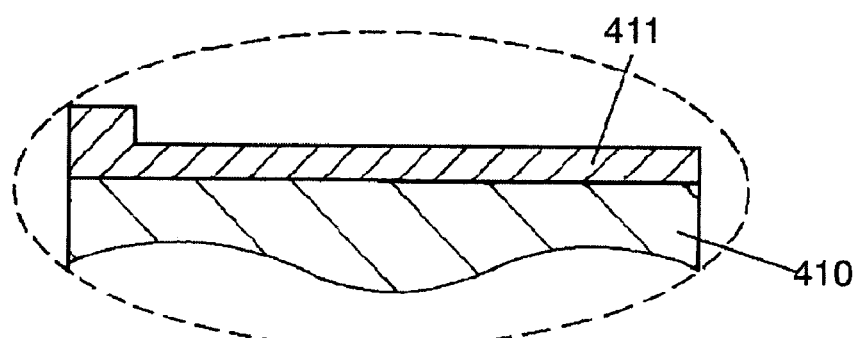
FIG. 14B is a sectional view of a dielectric film showing a conventional metalized film capacitor.
Figure 16:
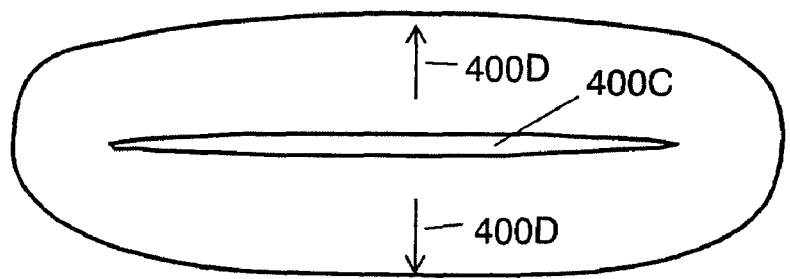
FIG. 16 is a front view showing a swollen phenomenon of a conventional capacitor element.
Figure 17:
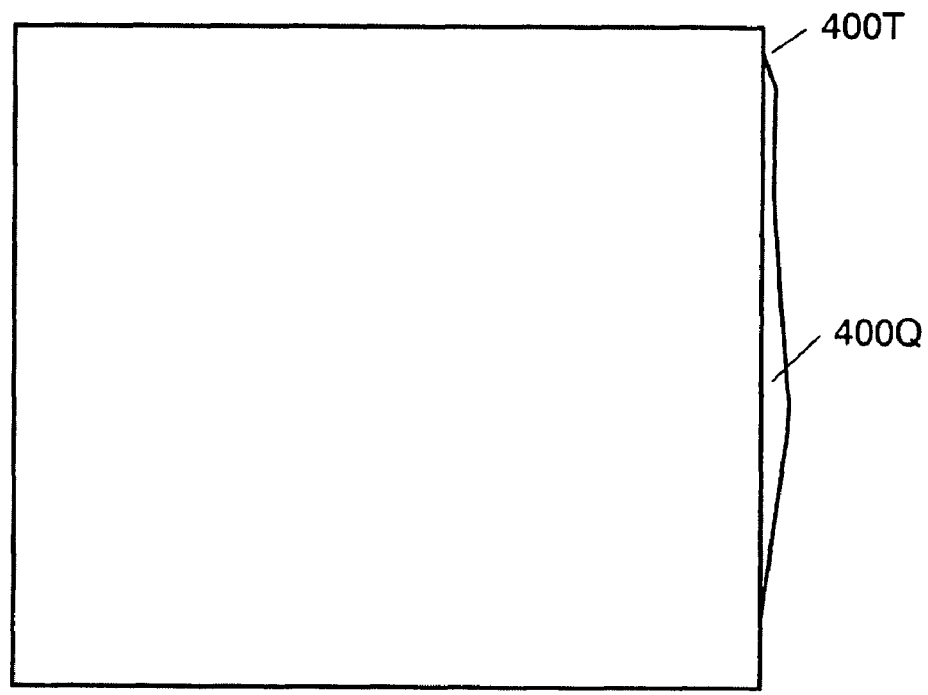
FIG. 17 is a plan view showing a protruding phenomenon of a conventional capacitor element.
Figure 18:
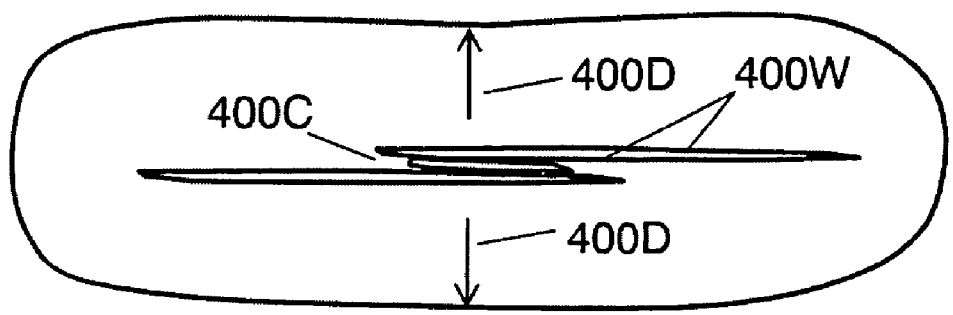
FIG. 18 is a front view showing wrinkles generated in a winding core of a conventional capacitor element.

FIG. 11 is a perspective view showing a configuration of a case mold type capacitor in accordance with a third exemplary embodiment of the present invention. FIGS. 12 and 13 are perspective views showing a configuration before molding. In FIGS. 11 to 13, metalized film capacitor element 201 having an elliptical sectional shape includes a dielectric film made of polypropylene. A metal vapor-deposited electrode is formed on one surface or both surfaces of the dielectric film so as to form a metalized film capacitor. A pair of the metalized films are wound so that they face each other with the dielectric film interposed therebetween. By forming metal sprayed electrodes by spraying zinc on both end surfaces of metalized film capacitor element 201, P pole electrode 201a and N pole electrode 201b are provided, respectively.

P pole bus bar 202 of tin-plated copper sheet has, at one end thereof, tongue-like soldering portion 202a bonded to the side of P pole electrode 201a of metalized film capacitor element 201. P pole terminal 202b for external connection is provided in a way in which it is pulled out from P pole bus bar 202. P pole bus bar 202 is configured in a flattened state, in which a sheet-like substrate is punched out.

N pole bus bar 203 of tin-plated copper sheet is bonded to the side of N pole electrode 201b. Tongue-like soldering portion 203a is provided at one end of N pole bus bar 203. N pole terminal 203b for external connection is provided in a way in which it is pulled out from N pole bus bar 203. Thus, N pole bus bar 203 has a stepwise configuration by punching out a sheet-like substrate, and then folding tongue-like soldering portion 203a from one end of a main flattened portion that is brought into contact with the peripheral surface of metalized film capacitor element 201 and folding N pole terminal 203b from the other end. Portion 203a and terminal 203b are folded in the opposite direction from each other.

Resin case 204 contains metalized film capacitor element 201 in which P pole bus bar 202 and N pole bus bar 203 are bonded to each other. Metalized film capacitor element 201, in which P pole bus bar 202 and N pole bus bar 203 are bonded to each other and contained in case 204, is molded with a mold resin (not shown) in a state in which neighboring P pole terminal 202b and N pole terminal 203b are protruded from the same side of case 204.

Hereinafter, specific Examples in accordance with a third exemplary embodiment is described.

Example 1

Figure 8A:
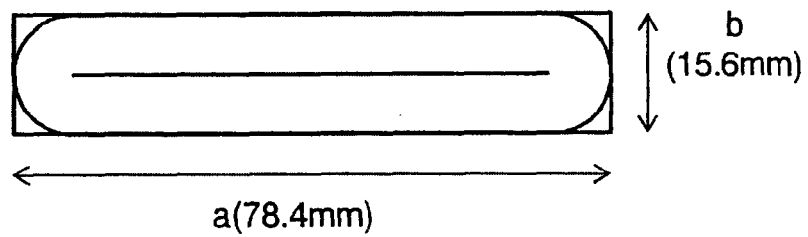
FIG. 8A is a sectional view showing a capacitor element produced in Example 1 in accordance with the second exemplary embodiment of the present invention.

A metalized film formed by using a polypropylene dielectric film having a thickness of 3 µm and a width of 80 mm is wound around a winding core so that the dimension from the winding core to the outer circumference of the capacitor element is 7.8 mm. Thus, a capacitor element having capacitance of 150 µF is produced. Subsequently, this capacitor element is subjected to flattening process so that the sectional shape of the capacitor element is an elliptical shape with major axis "a" of 78.4 mm and minor axis "b" of 15.6 mm, and thereby the flattening ratio "a/b" is about 5.0 and the volumetric efficiency of the capacitor element is 95.7% (see FIG. 8A). This is connected to a bus bar and placed in a case made of PPS resin (Sasteel P-60 manufactured by Tosoh Corporation, containing 40% glass fiber) and sealed with epoxy resin (EC285 manufactured by Sanyu Rec Co., Ltd.). Thus, a case mold type capacitor is produced.

To this case mold type capacitor, from the bus bar, sinusoidal current (30 A rms) in the frequency of 10 kHz is allowed to flow and heat generation by ripple current $\Delta T$ (K) in the center of the capacitor element is measured. The measurement results are shown in Table 2 together with the specification of the capacitor element. Table 2 also includes Examples described hereinafter.

TABLE 2

| | **1 (µm) | Film width (mm) | Capacitance (µF) | a/b | a (mm) | b (mm) | **2 b/2 (mm) | **3 | Volumetric efficiency (%) |
|---|---|---|---|---|---|---|---|---|---|
| Ex 1 | 3 | 80 | 150 | 5 | 78.4 | 15.6 | 7.8 | 6 | 95.7 |
| Ex 2 | 3 | 80 | 150 | 3.5 | 65.9 | 18.8 | 9.4 | 6.5 | 93.3 |
| Ex 3 | 3 | 80 | 150 | 3 | 61.2 | 20.4 | 10.2 | 7.2 | 91.8 |
| Ex 4 | 3 | 80 | 150 | 2.5 | 55.6 | 22.6 | 11.3 | 8.5 | 90.7 |
| Ex 5 | 3 | 80 | 150 | 1.7 | 46.8 | 28.0 | 14.0 | 9.9 | 83.4 |
| Ex 6 | 3 | 80 | 150 | 1.5 | 44.3 | 30.2 | 15.1 | 12 | 80 |
| Ex 7 | 3.5 | 80 | 150 | 4.2 | 82.7 | 20.0 | 10.0 | 7 | 52.3 |
| Ex 8 | 4 | 80 | 150 | 3 | 80.2 | 26.8 | 13.4 | 8.3 | 31 |

Ex = Example
**1: Thickness of dielectric film
**2: Dimension from winding core to outer circumferential surface of element
**3: Heat generation by ripple current in the center of element $\Delta T(K)$, 30 Arms, 10 kHz Example 2

Figure 8B:
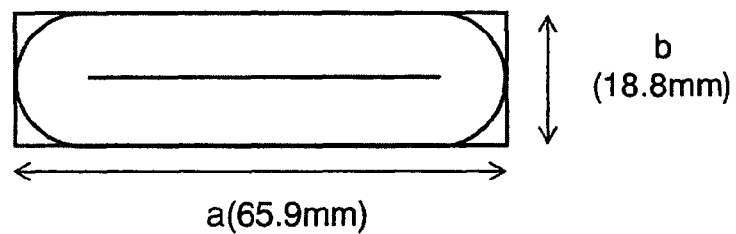
FIG. 8B is a sectional view showing a capacitor element produced in Example 2 in accordance with the second exemplary embodiment of the present invention.

Example 2 is carried out the same as in Example 1 except that the dimension from the winding core to the outer circumferential surface of the capacitor element is 9.4 mm, major axis "a" is 65.9 mm and minor axis "b" is 18.8 mm in the sectional shape of the capacitor element, and thereby the flattening ratio "a/b" is about 3.5 and the volumetric efficiency of the capacitor element is 93.3% (see FIG. 8B).

Example 3

Example 3 is carried out the same as in Example 1 except that the dimension from the winding core to the outer circumferential surface of the capacitor element is 10.2 mm, major axis "a" is 61.2 mm and minor axis "b" is 20.4 mm in the sectional shape of the capacitor element, and thereby the flattening ratio "a/b" is about 3.0 and the volumetric efficiency of the capacitor element is 91.8%.

Example 4

Figure 8C:
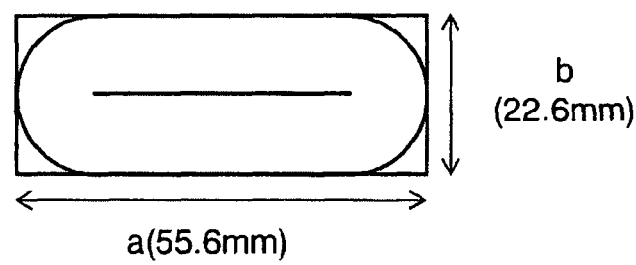
FIG. 8C is a sectional view showing a capacitor element produced in Example 4 in accordance with the second exemplary embodiment of the present invention.

Example 4 is carried out the same as in Example 1 except that the dimension from the winding core to the outer circumferential surface of the capacitor element is 11.3 mm, major axis "a" is 55.6 mm and minor axis "b" is 22.6 mm in the sectional shape of the capacitor element, and thereby the flattening ratio "a/b" is about 2.5 and the volumetric efficiency of the capacitor element is 90.7% (see FIG. 8C).

Example 5

Example 5 is carried out the same as in Example 1 except that the dimension from the winding core to the outer circumferential surface of the capacitor element is 14.0 mm, a major axis "a" is 46.8 mm and a minor axis "b" is 28.0 mm in the sectional shape of the capacitor element, and thereby the flattening ratio "a/b" is about 1.7 and the volumetric efficiency of the capacitor element is 83.4%.

Example 6

Figure 8D:
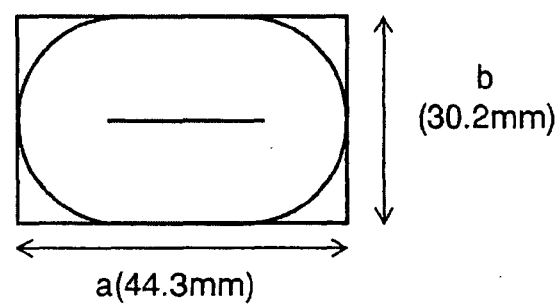
FIG. 8D is a sectional view showing a capacitor element produced in Example 6 in accordance with the second exemplary embodiment of the present invention.

Example 6 is carried out the same as in Example 1 except that the dimension from the winding core to the outer circumferential surface of the capacitor element is 15.1 mm, major axis "a" is 44.3 mm and minor axis "b" is 30.2 mm in the sectional shape of the capacitor element, and thereby the flattening ratio "a/b" is about 1.5 and the volumetric efficiency of the capacitor element is 80.0% (see FIG. 8D).

Example 7

Example 7 is carried out the same as in Example 1 except that the thickness of the dielectric film is 3.5 μm, the dimension from the winding core to the outer circumferential surface of the capacitor element is 10.0 mm, major axis "a" is 82.7 mm and minor axis "b" is 20.0 mm in the sectional shape of the capacitor element, and thereby the flattening ratio "a/b" is about 4.2 and the volumetric efficiency of the capacitor element is 52.3%.

Example 8

Example 8 is carried out the same as in Example 1 except that the thickness of the dielectric film is 4 μm, the dimension from the winding core to the outer circumferential surface of the capacitor element is 13.4 mm, major axis "a" is 80.2 mm and minor axis "b" is 26.8 mm in a sectional shape of the capacitor element, and thereby the flattening ratio "a/b" is about 3.0 and the volumetric efficiency of the capacitor element is 31.0%. Note here that the volumetric efficiency of the capacitor element is expressed by the following equation 1.

$$\text{volumetric efficiency}(\%) = \frac{\text{sectional area element portion}}{a_n \times b_n} \times \frac{a_1 \times b_1}{a_n \times b_n} \quad [\text{Equation 1}]$$

$a_1 \times b_1$: sectional area in Example 1

$a_n \times b_n$: sectional area in Example $n$

Figure 9:
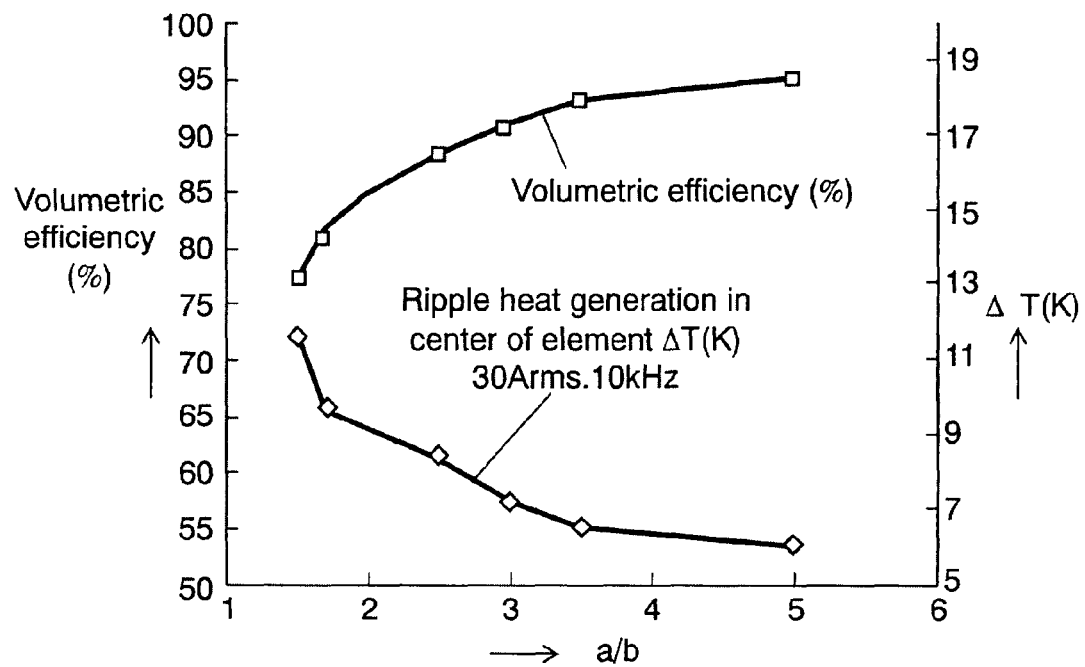
FIG. 9 is a characteristic graph showing a relation between the volumetric efficiency and a heat generation by ripple current in a center of the capacitor element produced in the second embodiment of the present invention.

FIGS. 8A to 8D are sectional views showing capacitor elements produced in the above-mentioned Examples 1, 2, 4 and 6, respectively. FIG. 9 is a characteristic graph showing the relation between the volumetric efficiency of the capacitor element obtained in each of the above-mentioned Examples and the heat generation by ripple current at the center portion of the capacitor element.

As is apparent from Table 2 and FIG. 9, according to the increase of the flattening ratio "a/b", which is a ratio of major axis "a" to minor axis "b" of the flattened capacitor element, it is shown that the heat generation by ripple current in the center portion of the capacitor element is reduced. Furthermore, it is also shown that the smaller the dimension from the winding core to the outer circumferential surface of the capacitor element is, the smaller the heat generation by ripple current in the center portion of the capacitor element is. Since this suggests that the heat generation is maximum in the center portion of the capacitor element, when the total thickness of the wound dielectric film is made to be thin, the temperature rise can be suppressed.

Furthermore, from Examples 7 and 8, it is shown that since the thickness of the dielectric film is larger, the volumetric efficiency is reduced. In particular, in Example 8, it is shown that the reduction of volumetric efficiency (31%) is significant.

In the metalized film capacitor in accordance with the third exemplary embodiment, when the thickness of the dielectric film is made to be 3.5 μm or less, and the flattening ratio "a/b" is made to be 3.0 or more, the heat generation by ripple current in the center portion of the capacitor element can be reduced.

Thus, the metalized film capacitor in accordance with the present invention can achieve both a small and thin size and a large capacity.

Because the present invention can achieve both a small and thin size and a large capacity, dead space can be reduced or used efficiently. Thus, different kinds of metalized film capacitor elements can be contained in the same case, which has not been carried out in a conventional capacitor. One of the examples of different kinds of metalized film capacitor elements having the largest effect is a combination of a smoothing capacitor and a noise removing capacitor. Furthermore, by connecting these different kinds of metalized film capacitor elements by the use of the same bus bar, furthermore, small size and low cost can be achieved. Note here that the noise removing capacitor includes a snubber capacitor for absorbing a surge voltage, a common mode capacitor (Y-type capacitor) for removing noises in the radio frequency band, or the like.

INDUSTRIAL APPLICABILITY

A metalized film capacitor in accordance with the present invention has advantages that a stable contact state between a metal sprayed electrode and a dielectric film is maintained, tan δ is not deteriorated and excellent performance can be maintained even when a use temperature range is increased and thermal stress is increased. In particular, the metalized film capacitor is useful as a capacitor for smoothing a vehicle-mounted inverter circuit, a capacitor for smoothing a drive circuit of a vehicle drive motor, or the like.

A case mold type capacitor in accordance with the present invention has an advantage that a small and thin size and a large capacity can be achieved simultaneously. In particular, it is useful for smoothing an inverter circuit for a drive motor of a hybrid electric vehicle, and the like.

(85) Furthermore, a metalized film capacitor of the present invention can achieve a small and thin size, improve volumetric efficiency and realize a large capacity. In particular, it is useful for smoothing an inverter circuit of a drive motor of a hybrid electric vehicle, so that industrial applicability is high.

The invention claimed is:

1. A metalized film capacitor comprising:
   metalized films; and
   a pair of extraction electrodes formed on both end surfaces of the metalized films, wherein only one end of each of the metalized films is alternately connected to one of the extraction electrodes, each of the metalized films including:
  a dielectric film of an organic polymer; and
  a metal vapor-deposited electrode formed on the dielectric film in a way in which a non metal vapor-deposited portion that is an exposed portion of the dielectric film is continuously left in a longitudinal direction of one end in a width direction of the dielectric film,
the metalized film being wound around a winding core in a way in which the non metal vapor-deposited portions are disposed in an opposite direction and a pair of the metal vapor-deposited electrodes face each other with the dielectric film interposed therebetween in a state in which they are shifted by a predetermined dimension so as to widen in the width direction, thereby forming the metalized film capacitor having an elliptical sectional shape with a linear portion and a curved portion,
wherein in the elliptical sectional shape, when a major axis is denoted by "a" and a minor axis is denoted by "b", "a" is not less than 60 mm,
the dimension shifted in the width direction is not less than 1.2 mm when the dimension of the major axis "a" is not less than 60 mm and less than 100 mm,
the dimension shifted in the width direction is not less than 1.3 mm when the dimension of the major axis "a" is not less than 100 mm and less than 120 mm, and
the dimension shifted in the width direction is not less than 1.4 mm when the dimension of the major axis "a" is not less than 120 mm,
the winding core is obtained by winding, 5 to 10 turns, a polypropylene film having a thickness of 3 to 10 times as thick as the thickness of the dielectric film constituting the metalized film; and a dimension from this winding core to a circumferential surface is not more than 14 mm, and
at least a part of an end portion of the winding core is welded at a heat sealing and this heat sealing is provided with a plurality of concave portions.

2. The metalized film capacitor of claim 1, wherein divided electrodes are formed by providing a slit so that non metal vapor-deposited portions that are exposed portions of the dielectric film are left in the metal vapor-deposited electrode portion at an equal interval in a width direction.

3. The metalized film capacitor of claim 1, wherein the metal vapor-deposited electrode has a first surface contacting the dielectric film and a second surface opposite side of the first surface, and each of the extraction electrodes has a projection extending onto the second surface of the metal vapor-deposited electrode.

4. The metalized film capacitor of claim 1, wherein one end portion of the metal vapor-deposited electrode of each of the metalized films connected each of the extraction electrodes is thicker than other portion of the vapor-deposited electrode.

5. A metalized film capacitor, comprising:
  a capacitor element formed by winding metalized films, each of the metalized films including a metal vapor-deposited electrode formed on a polypropylene film, around a winding core in a way in which a pair of metal vapor-deposited electrodes face each other with a dielectric film interposed therebetween in a state in which they are shifted by a predetermined dimension so as to widen in the width direction, and flattening thereof, so that the sectional shape is formed in an elliptical shape with a linear portion and a curved portion; and
  a pair of extraction electrodes provided on both end surfaces of the capacitor element, respectively, wherein only one end of each of the metalized films is alternately connected to one of the extraction electrodes,
  wherein in the elliptical sectional shape, "a/b" is not less than 3 and "a" is not less than 60 mm in which a major axis is denoted by "a" and a minor axis is denoted by "b";
  the dimension shifted in the width direction is not less than 1.2 mm when the dimension of the major axis "a" is not less than 60 mm and less than 100 mm,
  the dimension shifted in the width direction is not less than 1.3 mm when the dimension of the major axis "a" is not less than 100 mm and less than 120 mm, and
  the dimension shifted in the width direction is not less than 1.4 mm when the dimension of the major axis "a" is not less than 120 mm,
  the winding core is obtained by winding, 5 to 10 turns, a polypropylene film having a thickness of 3 to 10 times as thick as the thickness of the dielectric film constituting the metalized film; and a dimension from this winding core to a circumferential surface is not more than 14 mm,
  at least a part of an end portion of the winding core is welded at a heat sealing and this heat sealing is provided with a plurality of concave portions.

6. The metalized film capacitor of claim 5, wherein a thickness of the dielectric film constituting the capacitor element is not more than 3.5 μm.

7. The metalized film capacitor of claim 5, wherein a rated capacity is not less than 150 μF and a potential gradient at rating is not less than 150 V/μm.

8. The metalized film capacitor of claim 5, wherein the metal vapor-deposited electrode formed on the dielectric film is provided with divided electrodes, and the divided electrodes are connected in parallel by fuse so as to form a self protective function.

9. The metalized film capacitor of claim 5, wherein the metal vapor-deposited electrode has a first surface contacting the dielectric film and a second surface opposite side of the first surface, and each of the extraction electrodes has a projection extending onto the second surface of the metal vapor-deposited electrode.

10. The metalized film capacitor of claim 5, wherein one end portion of the metal vapor-deposited electrode of each of the metalized films connected each of the extraction electrodes is thicker than other portion of the vapor-deposited electrode.

11. A case mold type capacitor, comprising: a plurality of metalized film capacitors, including:
  a capacitor element formed by winding metalized films, each of the metalized films including a metal vapor-deposited electrode formed on a polypropylene film, around a winding core in a way in which a pair of metal vapor-deposited electrodes face each other with a dielectric film interposed therebetween, and flattening thereof, so that the sectional shape is formed in an elliptical shape with a linear portion and a curved portion; and
  a pair of extraction electrodes provided on both end surfaces of the capacitor element, respectively, wherein only one end of each of the metalized films is alternately connected to one of the extraction electrodes,
  wherein in the elliptical sectional shape, "a/b" is not less than 3 and "a" is not less than 60 mm in which a major axis is denoted by "a" and a minor axis is denoted by "b";
  the dimension shifted in the width direction is not less than 1.2 mm when the dimension of the major axis "a" is not less than 60 mm and less than 100 mm,
  the dimension shifted in the width direction is not less than 1.3 mm when the dimension of the major axis "a" is not less than 100 mm and less than 120 mm, and the dimension shifted in the width direction is not less than 1.4 mm when the dimension of the major axis "a" is not less than 120 mm, the winding core is obtained by winding, 5 to 10 turns, a polypropylene film having a thickness of 3 to 10 times as the thickness of the dielectric film constituting the metalized film; and a dimension from this winding core to a circumferential surface is not more than 14 mm, and at least a part of an end portion of the winding core is welded at a heat sealing and this heat sealing is provided with a plurality of concave portions, wherein polarities of the pair of extraction electrodes formed on the plurality of metalized film capacitors are allowed to match each other, and a pair of bus bars are respectively connected to the pair of extraction electrodes, wherein one end portion of the metal vapor-deposited electrode of each of the metalized films connected each of the extraction electrodes is thicker than other portion of the vapor-deposited electrode, and wherein the thicker portion of the metal vapor-deposited electrode has a first surface contacting the dielectric film and a second surface opposite side of the first surface, and each of the extraction electrodes has a projection extending onto and covering the second surface of the thicker portion of the metal vapor-deposited electrode.

12. The case mold type capacitor of claim 11, wherein terminal portions for external connection respectively provided on the pair of bus bars are taken out from a same side.

13. The case mold type capacitor of claim 11, wherein different kinds of metalized film capacitor elements are contained in a same case.

14. The case mold type capacitor of claim 13, wherein the different kinds of metalized film capacitor elements include a smoothing capacitor and a noise removing capacitor.

15. The case mold type capacitor of claim 11, wherein different kinds of metalized film capacitor elements are connected by using a same bus bar.

16. The case mold type capacitor of claim 11, wherein the metal vapor-deposited electrode has a first surface contacting the dielectric film and a second surface opposite side of the first surface, and each of the extraction electrodes has a projection extending onto the second surface of the metal vapor-deposited electrode.

17. The case mold type capacitor of claim 11, wherein one end portion of the metal vapor-deposited electrode of each of the metalized films connected each of the extraction electrodes is thicker than other portion of the vapor-deposited electrode.

18. A metalized film capacitor, comprising:

a capacitor element formed by winding metalized film including a metal vapor-deposited electrode formed on a polypropylene film, around a winding core in a way in which a pair of metal vapor-deposited electrodes face each other with a dielectric film interposed therebetween, and flattening thereof, so that the sectional shape is formed in an elliptical shape; and a pair of extraction electrodes provided on both end surfaces of the capacitor element, respectively, wherein in the elliptical sectional shape, "a/b" is not less than 3 and "a" is not less than 60 mm in which a major axis is denoted by "a" and a minor axis is denoted by "b";

the winding core is obtained by winding, 5 to 10 turns, a polypropylene film having a thickness of 3 to 10 times as thick as the thickness of the dielectric film constituting the metalized film; and a dimension from this winding core to a circumferential surface is not more than 14 mm, wherein at least a part of an end portion of the winding core is welded at a heat sealing and this heat sealing is provided with a plurality of concave portions.

\* \* \* \* \*